United States Patent Office
3,798,235
Patented Mar. 19, 1974

3,798,235
NOVEL METHOD FOR PRODUCING 1-PHENYL-3-INDOLYLACETIC ACID DERIVATIVES
Hisao Yamamoto, Nishinomiya, Atsuko Hirohashi, Ashiya, and Takahiro Izumi and Masao Koshiba, Takarazuka, Japan, assignors to Sumitomo Chemical Company, Limited, Osaka, Japan
No Drawing. Filed Sept. 9, 1971, Ser. No. 179,182
Claims priority, application Japan, Dec. 9, 1967, 42/79,170
Int. Cl. C07d 27/56
U.S. Cl. 260—326.13 R      1 Claim

ABSTRACT OF THE DISCLOSURE 1-phenyl-3-indolylacetic acid derivatives having anti-inflammatory, analgesic and anti-pyretic activities, of the formula,

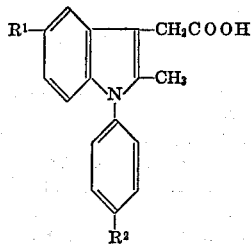

wherein $R^1$ is an alkyl group having up to 4 carbon atoms or an alkoxy group having up to 4 carbon atoms, and $R^2$ is a hydrogen or halogen atom, can be produced by contacting levulinic acid with diphenylamine derivatives of the formula,

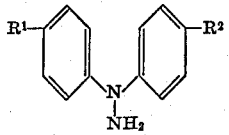

wherein $R^1$ and $R^2$ are defined as above, which are prepared by contacting diphenylamines of the formula,

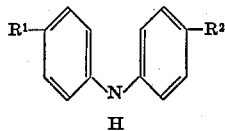

---

This invention relates to a process for producing 1-phenyl-3-indolylacetic acid derivatives, and more particularly to a process for producing 1-phenyl-3-indolylacetic acid derivatives of the general structural Formula I,

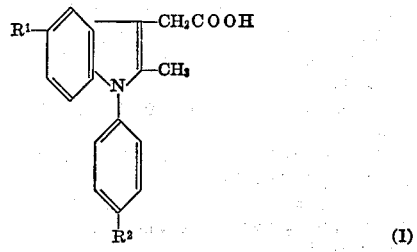

wherein $R^1$ is an alkyl group having up to 4 carbon atoms or an alkoxy group having up to 4 carbon atoms, and $R^2$ is a hydrogen atom or a halogen atom, and their esters.

1-phenyl-3-indolylacetic acid derivatives obtained in the present invention have a potent anti-inflammatory activity, and for example, 1-phenyl-2,5-dimethyl-3-indolylacetic acid, 1-phenyl-2-methyl-5-methoxy-3-indolylacetic acid, ethyl 1-phenyl-2-methyl-5-methoxy-3-indolylacetate, 1-(p-chlorophenyl) - 2 - methyl - 5 - methoxy - 3 - indolylacetic acid, etc. show 50% or more inhibition of carrageenin-induced edema of rats' hind paws, when administered in an amount of 10–25 mg. to the rats. Further, these compounds exhibit a potent analgesic activity in the Randal-Selito method, and a remarkable anti-pyretic activity in the pyrogen test.

It is an object of the present invention to provide a new and improved method for the preparation of the valuable products mentioned above in both laboratory scale and commercial scale.

The present compounds of the Formula I can be advantageously prepared by the reaction of levulinic acid or its esters and diphenylamine derivatives of the following Formula II,

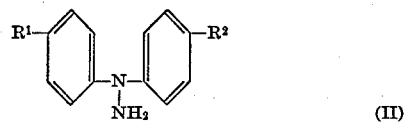

wherein $R^1$ and $R^2$ are defined as above, according to the Fischer indole synthesis. The diphenyl amine derivatives are produced by the reduction of N-nitroso diphenylamine derivatives of the Formula III,

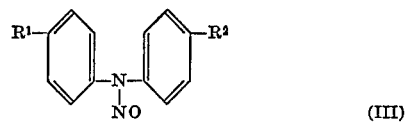

wherein $R^1$ and $R^2$ are defined as above, which are obtained by treating diphenylamine derivatives of the following Formula IV,

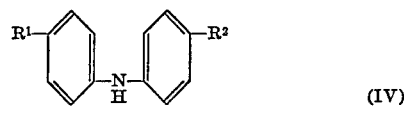

wherein $R^1$ and $R^2$ are defined as above, with nitrous acid or nitrites.

In the method for treating diphenylamine derivatives of the Formula IV with nitrous acid or nitrites, the reaction proceeds even in the absence of solvent, but preferably in the presence of a suitable solvent such as water, ethyl alcohol or the like.

The reaction can be carried out at a temperature within a range of —20° C. to 50° C., preferably —15° C. to 30° C. There can be used potassium nitrate, sodium nitrate or the like as nitroso-substituting agent. And the next reduction process can be carried out without isolating the resulting N-nitrosodiphenylamine derivatives. However, it is preferable that the reduction process is carried out after the isolation and purification of N-nitrosodiphenylamine derivatives of the Formula III, because the latter method gives the aimed product of the Formula II in higher yield and higher purity.

As a reducing agent used in the reduction of the compound of the Formula III, there may be used a metal salt-mineral acid, such as stannous chloride-hydrochloric acid, zinc-hydrochloric acid, zinc-acetic acid or the like, metal-basic agent, such as zinc-alcoholic potash, ferrous sulfate-aqueous ammonia or the like.

The reduction is carried out preferably in a suitable solvent such as water, alcohol, acetic acid or the like, because of obtaining the aimed product of the Formula II in higher yield. The reaction temperature may be 0° C. to 150° C., preferably 10° C. to 100° C.

In the reaction of N′,N′-diphenylhydrazine derivatives of the Formula II with levulinic acid or its esters, the reaction may proceed occasionally in the absence of a solvent, but, preferably in the presence of a suitable solvent because of a high yield and economical advantages. As a suitable solvent, there can be used an organic acid such as acetic acid, propionic acid and the like, an usual inert organic solvent such as toluene, xylene, benzene, dioxan or the like, or other general organic solvents such as alcohols or the like.

And, the reaction proceeds smoothly in the presence or absence of a condensing agent. However it is possible in the presence of a condensing agent to carry out the reaction in a lower reaction temperature in general. As the condensing agent in this reaction, there may be used a mineral acids such as hydrogen chloride, sulfuric acid or the like, a Lewis acid such as zinc chloride, boron trifluoride or the like, polyphosphoric acid and the like. The reaction may be carried out at a temperature of 50° C. to 150° C., preferably 65° C. to 95° C.

Due to electron donating tendency of a p-substituent of a benzene ring, the indole formation is observed to proceed in one side cyclization. For example, when N'-phenyl-p-methoxyphenylhydrazine is reacted with levulinic acid, only 1-phenyl-2-methyl-5-methoxy-3-indolylacetic acid is obtained as the reaction product, but another isomer, 1-(p-methoxy-phenyl)-2-methyl-3-indolylacetic acid cannot be recognized as a product at all as a following schema.

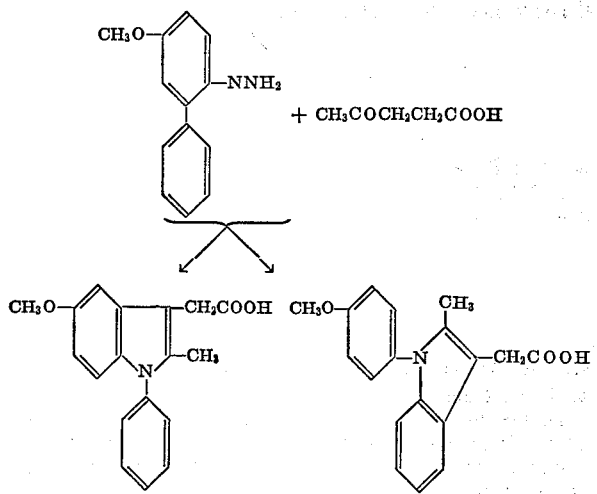

From this result of the reaction, it is considered that the rearrangement takes place in one side of higher electron-denisty-ortho-position in two phenyl rings of the reaction intermediate as follows.

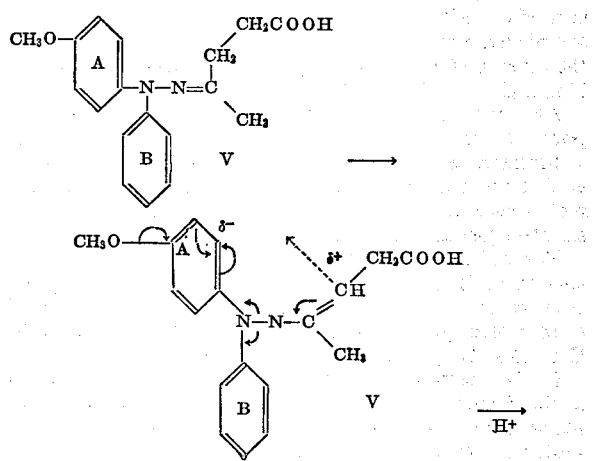

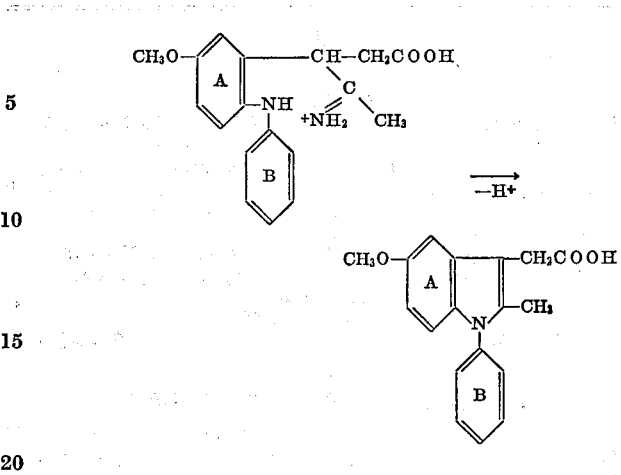

That is to say, the selectron density in the ortho position of the ring A is much higher than that of the ortho position of the ring B in the enehydrazine compound of the Formula V due to electron donating tendency of a methoxy group. Therefore, the rearrangement was found to occur in the ring A only, but not in the ring B.

The electron donating tendency is in the following order; an alkoxy group, an alkyl group $\gg$ a hydrogen atom $>$ a halogen atom. In the present case, $R^1$ is an alkoxy or alkyl group, which $R^2$ is a hydrogen or chlorine atom. Therefore, this cyclization takes place in one side only, so that the aimed compound of the Formula I is obtained in high yield.

The present method can be said to be most advantageous for preparing commercially these notably valuable 1-phenyl-3-indolylacetic acid derivatives.

The following examples illustrate the invention but are not to be construed as a limitation thereof.

EXAMPLE 1

(1) After 143 g. of 4-methyldiphenylamine was dissolved in a mixture of 500 ml. of ethanol and 113.1 ml. of concentrated hydrochloric acid, a solution of 53 g. of sodium nitrite in 195 ml. of water was added dropwise thereto while cooling. After addition, the reaction mixture was stirred for two hours at 5°–6° C. After crystals produced were collected by filtration, and washed with water to give 444 g. of wet crude crystals of N-nitroso-4-methyldiphenylamine. The melting point was 70° C.

(2) After 154 g. of a zinc powder was added to a suspension of the crude crystals of N-nitroso-4-methyldiphenylamine in 500 ml. of ethanol, 160 ml. of glacial acetic acid was added dropwise to the mixture at a temperature of 10°–20° C. while ice-cooling. After completion of addition, the reaction mixture was stirred for one hour at a room temperature, and then was heated slowly up to 80° C. and maintained at that temperature for ten minutes. After removing insolvable product by hot filtration, the aqueous layer was neutralized with 40% sodium hydroxide aqueous solution, and cooled and filtered to give 336.9 g. of crude crystals of $N^1$-phenyl-4-methylphenylhydrazine having a melting point of 62° C. Recrystallization from petroleum ether gave colorless needles of the melting point 62.5–63° C.

(3) After 336.9 g. of crude crystals of $N^1$-phenyl-4-methylphenylhydrazine was dissolved in 1500 ml. of ether, an insoluble substance was removed by filtration. When ethanolic hydrochloric acid (containing 30.3 g. of hydrogen chloride) was added dropwise to the filtrate, 132.9 g. of $N^1$-phenyl-p-methylphenylhydrazine hydrochloride was obtained as crystals. Recrystallization from a solvent mixture of ethanol and ether gave colorless needles having a melting point of 149.5° C.

(4) The mixture of 3 g. of $N^1$-phenyl-p-methylphenylhydrazine hydrochloride and 6 g. of levulinic acid was heated at 75°–80° C. for 4 hours. After completion of the reaction, the reaction mixture was poured into water. The crystals produced were collected by filtration and washed with water to give 3.6 g. (theoretical yield) of 1-phenyl-2,5-dimethyl-3-indolylacetic acid having a melting point 127°–131° C. Recrystallization from a mixture of ether and petroleum ether was repeated twice, and gave colorless needles having a melting point of 147°–148.5° C.

EXAMPLE 2

According to the method similar to that in Example 1, following compounds were obtained.

(1) N-nitroso-4-methoxydiphenylamine, melting point, 80.5°–83.0° C.

(2) $N^1$-phenyl-4-methoxyphenylhydrazine, melting point, 75°–77° C. (from petroleum ether).

(3) $N^1$-phenyl-4-methoxyphenylhydrazine hydrochloride, melting point, 189°–192° C. (from ethanol-ether).

(4) The mixture of 3 g. of $N^1$-phenyl-p-methoxyphenylhydrazine hydrochloride and 6 g. of levulinic acid was heated for 4 hours at 75°–80° C. After completion of the reaction, the reaction mixture was extracted with ether. From the ethereal layer was obtained 4.2 g. (94.5%) of a brown oily substance. The product was chromatographed and eluted with methylene dichloride to give 2.1 g. of 1-phenyl-2-methyl-5-methoxy-3-indolylacetic acid having a melting point of 104°–108° C. Recrystallization from a solvent mixture of ether and petroleum ether gave colorless needles having a melting point of 112.5°–113.5° C.

EXAMPLE 3

The mixture of 3 g. of $N^1$-phenyl-p-methoxyphenylhydrazine hydrochloride (obtained in Example 2) and 8 g. of ethyl levulinate was treated by the procedure similar to that in Example 2, and oily ethyl 1-phenyl-2-methyl-5-methoxy-3-indolylacetate was obtained. The oily product was allowed to stand in a refrigerator and solidified. The melting point of the solidified substance was 50°–55° C.

EXAMPLE 4

(1) According to the method similar to that in Example 1, $N^1$-(p-methoxyphenyl)p-chlorophenylhydrazine hydrochloride was prepared from 4-methoxy-4'-chlorodiphenylamine. The melting point was 173°–174° C. (decomposition).

(2) Further, the mixture of 3.5 g. of $N^1$-(p-methoxyphenyl)-p-chlorophenylhydrazine hydrochloride and 6 g. of levulinic acid was heated for 4 hours at 75°–85° C. The reaction mixture was washed with water. The crystals produced were recrystallized from acetone-water, and 3.7 g. of 1 - (p-chlorophenyl)-2-methyl-5-methoxy-3-indolylacetic acid having a melting point of 171°–172° C. was obtained.

What is claimed is:

1. 1-phenyl-3-indolylacetic acid derivative of the formula,

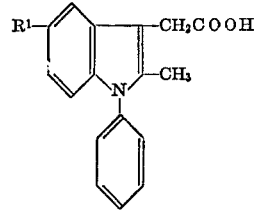

wherein $R^1$ is an alkyl group having up to 4 carbon atoms or an alkoxy group having up to 4 carbon atoms, and its ethyl ester.

References Cited

UNITED STATES PATENTS

| | | | |
|---|---|---|---|
| 2,701,250 | 2/1955 | Fox et al. | 260—326.13 R |
| 3,271,416 | 9/1966 | Shen et al. | 260—326.13 R |
| 3,629,284 | 12/1971 | Yamamoto et al. | 260—326.13 A |

OTHER REFERENCES

Smith, Chemistry of Open-Chain Organic Nitrogen Compounds, vol. II, p. 145 (1966).

JOSEPH A. NARCAVAGE, Primary Examiner

U.S. Cl. X.R.

260—518 R, 519, 999